United States Patent [19]

Kettlestrings

[11] Patent Number: 5,636,819
[45] Date of Patent: Jun. 10, 1997

[54] TOOLLESS RAFTER AND JOIST HANGER

[76] Inventor: Jack S. Kettlestrings, 900 Bainbridge Dr., Naperville, Ill. 60563

[21] Appl. No.: 427,839

[22] Filed: Apr. 26, 1995

[51] Int. Cl.⁶ .................................................. F16L 3/08
[52] U.S. Cl. .......................... 248/216.1; 52/702; 52/712; 248/228.4; 248/231.51; 248/231.85; 248/546
[58] Field of Search .................. 24/457, 498, 512; 52/698, 699, 700, 702, 712, 714, 715; 248/49, 65, 58, 72, 215, 216.1, 216.4, 217.1, 217.2, 217.4, 221.11, 222.14, 226.11, 227.1, 228.1, 228.2, 228.6, 228.4, 230.2, 230.4, 230.6, 231.31

[56] References Cited

U.S. PATENT DOCUMENTS

| | | | |
|---|---|---|---|
| 141,498 | 8/1873 | Edmonston | 248/217.1 X |
| 222,086 | 11/1879 | Slemmer | 248/227.1 |
| 950,978 | 3/1910 | Williams | 248/72 |
| 1,794,976 | 3/1931 | Mueller | 248/72 X |
| 2,316,053 | 4/1943 | Davis | 248/215 |
| 2,354,746 | 8/1944 | Duzmal | 248/228.2 |
| 2,749,068 | 6/1956 | Wayman | 248/72 |
| 3,207,463 | 9/1965 | Downey | 248/339 |
| 3,734,436 | 5/1973 | Liberman | 248/58 |
| 4,706,922 | 11/1987 | Grow | 248/58 X |
| 4,796,848 | 1/1989 | Lanz | 248/216.1 X |
| 5,542,631 | 8/1996 | Bruno | 248/58 |

FOREIGN PATENT DOCUMENTS

| | | | |
|---|---|---|---|
| 176406 | 10/1953 | Germany | 248/58 |
| 114781 | 9/1945 | Sweden | 248/297.51 |
| 471298 | 3/1969 | Switzerland | 248/217.1 |
| 369174 | 3/1932 | United Kingdom | 248/228.4 |

*Primary Examiner*—Carl D. Friedman
*Assistant Examiner*—Kevin D. Wilkens
*Attorney, Agent, or Firm*—Hill, Steadman & Simpson

[57] ABSTRACT

A single entity toolless rafter or joist hanger has a claw with pointed spaced arms forming a mouth in which a conventional wooden base member is inserted. A hook on the other end of the hanger provides a loading surface formed with a force point disposed on an axis laterally offset from the normal vertical axis of the base, thereby promoting a firm gripping action. Automatic locking is achieved by a pivoted arm which gravitationally abuts against the side of the rafter or joist. The hanger is selectively removable simply by raising the pivoted arm and counter rotating the hanger to disengage it from the wood.

11 Claims, 2 Drawing Sheets

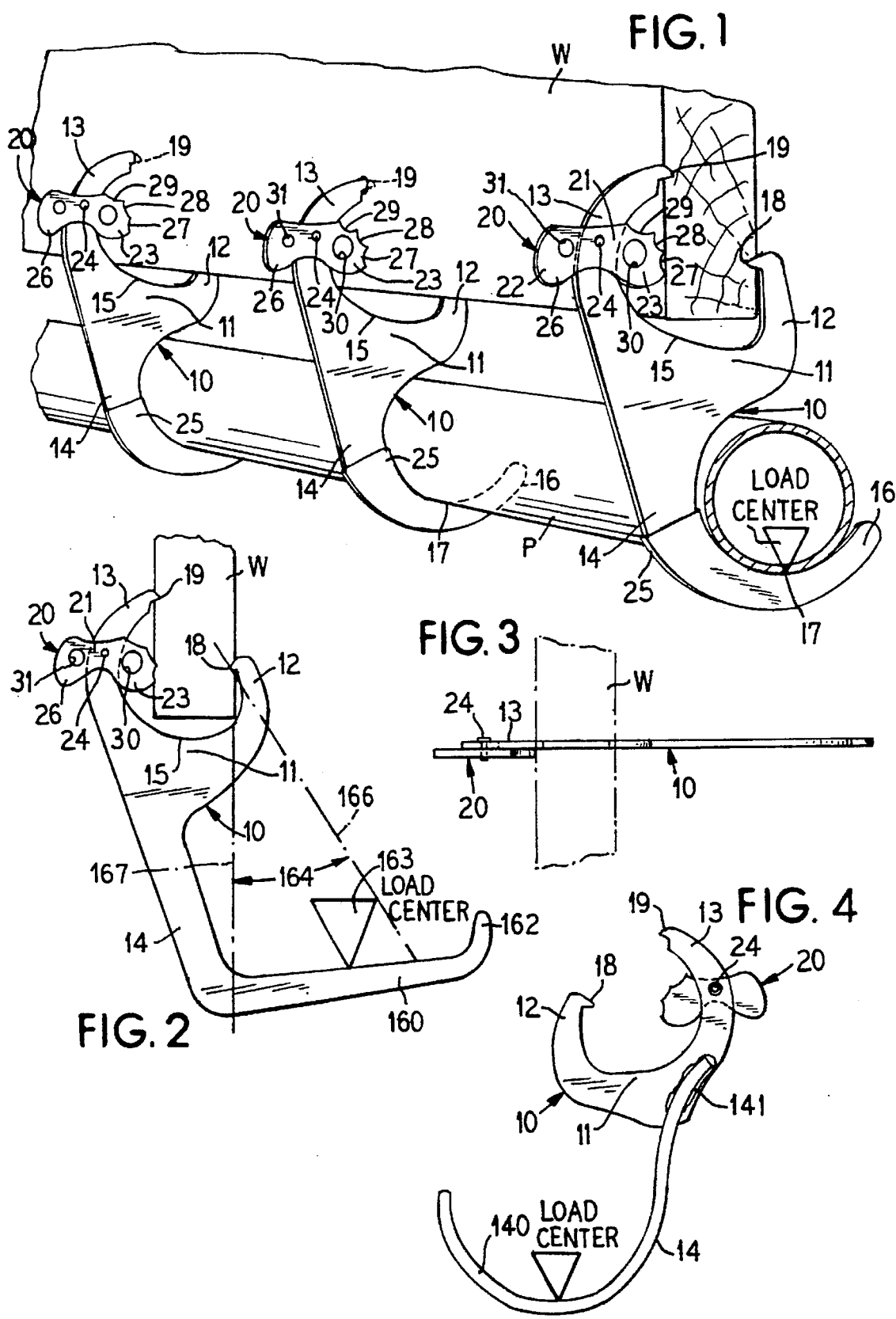

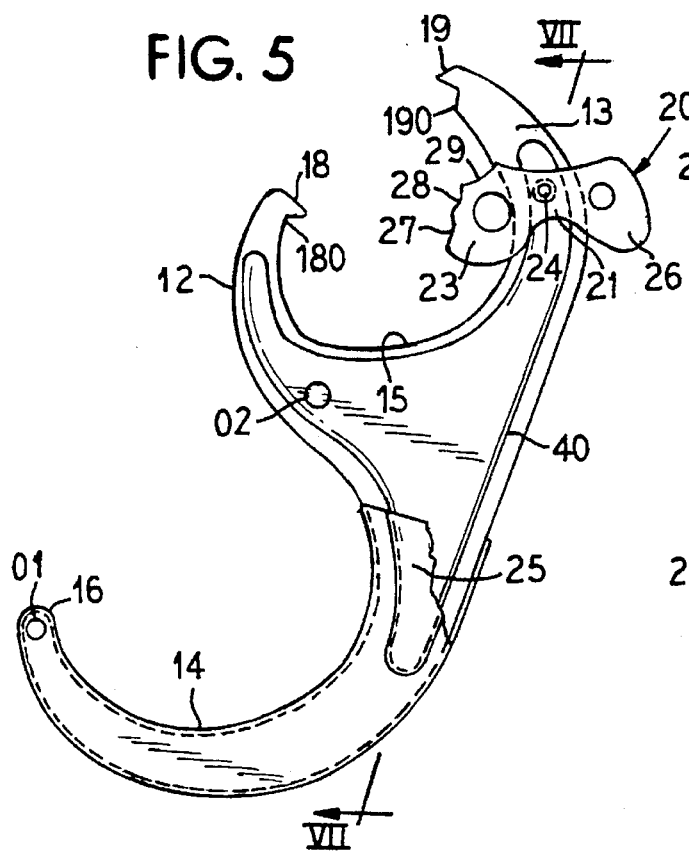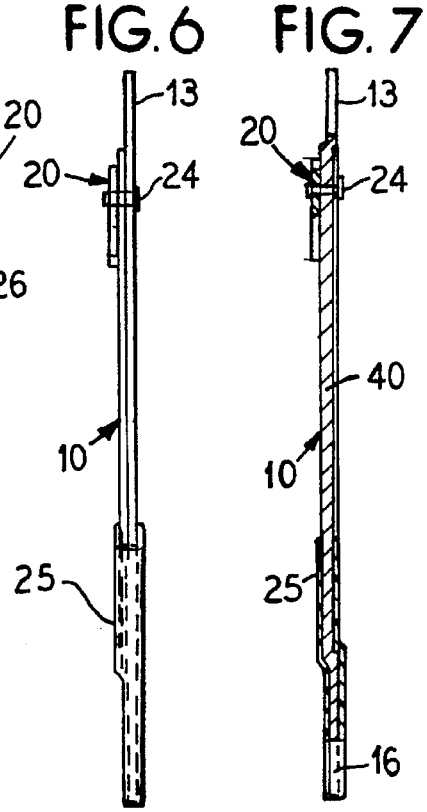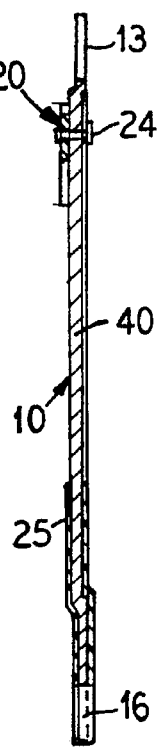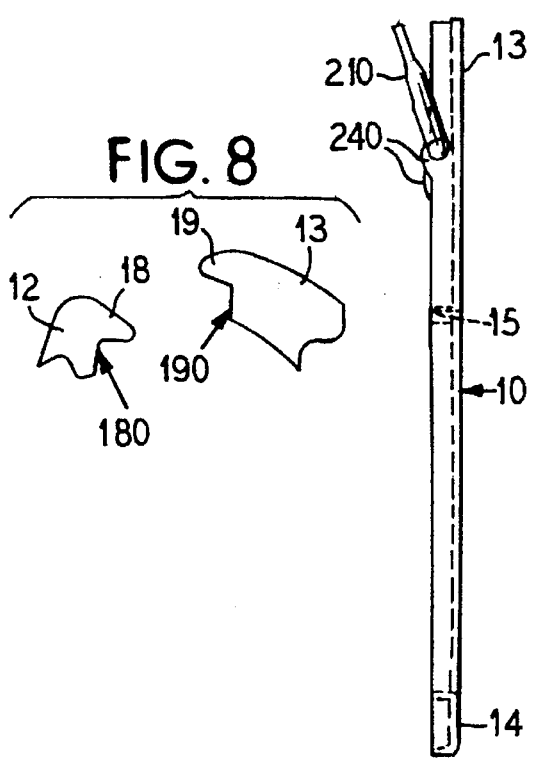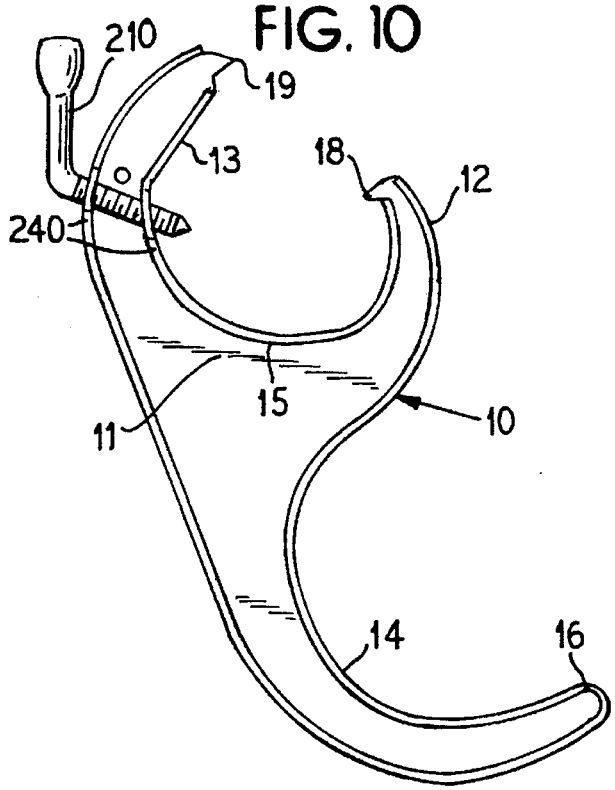

TOOLLESS RAFTER AND JOIST HANGER

BACKGROUND OF THE INVENTION

1. Field of the Invention:

This invention relates to a utility hanger device which can be installed and/or removed selectively without the use of tools, merely by use of a gravity lock cam which assists in holding the hanger on a rafter or a joist of an architectural structure against accidental dislodgment.

2. The Prior Art:

In a normal prior art hanger construction, several styles are available. However, with the hanger devices which are adapted to be attached to wood, traditional fastening means such as screws, nails or self-contained threads are provided by means of which the hanger may be secured to a wood mounting means and/or suspended from a base member in order to develop a utilitarian hanger function.

In one form of mechanical hanger, the so-called "ice tong" concept is utilized. In such a structure, there is usually provided two separate elements which are pivotally connected together. The hinge point at which the two elements are interconnected permits the user to direct two points on the working end of the elements against a surface and to apply a gripping torque by pivotally displacing the opposite ends of the elements

SUMMARY OF THE PRESENT INVENTION

The present invention contemplates the construction of a single entity hanger device which incorporates and combines several design features that offer unusual versatility. A flat thin article, somewhat elongate in configuration, has a first arm, or hook-shaped portion, at one end, and a second arm, or a generally C or U-shaped portion, at its opposite end large enough to start the engagement of the hanger article with a board, such as a rafter or a joist.

The C-shaped portion has two free ends each characterized by a point adapted to dig into a yieldable wooden surface, such as that presented by a rafter or a joist. Further, the two arms are disposed on different axes, i.e., the C-shaped portion is disposed on an axis which is different than the corresponding axis of the hook portion so that a downward force on the hook will subject the hanger to a vector force producing a moment arm tending to further engage the points into the adjoining wood surfaces.

When the hanger is hung vertically from a rafter, as it would when normally installed, a small cam connected to the C-shaped arm settles into position and engages the rafter to prevent removal of the hanger, thereby preventing accidental dislodgement.

DESCRIPTION OF THE DRAWINGS

FIG. 1 is a perspective view illustrating a point of utilization for a hanger embodying the principles of the present invention and showing three hangers mounted on a wooden base such as a rafter or a joist.

FIG. 2 is an elevational view showing an alternative form of the invention wherein an extended hook arm is utilized.

FIG. 3 is a side view of the hanger of FIG. 2.

FIG. 4 is an elevational view showing yet another form of the invention wherein is provided a combination of a stamping and a wire form construction.

FIG. 5 is a view similar to FIG. 2 but showing yet another form of the invention.

FIG. 6 is a side elevational view of the device shown in FIG. 5.

FIG. 7 is a cross-sectional view taken on line VII—VII of FIG. 5.

FIG. 8 is a fragmentary broken view showing in enlarged detail the depth stopper shapes of the points on the arms of the hanger device.

FIG. 9 is a side elevation of a further modified form of the invention wherein a threaded locking bolt is used in lieu of the cam.

FIG. 10 is a front elevation of the hanger of FIG. 9.

DESCRIPTION OF THE PREFERRED EMBODIMENTS

Although the principles of the present invention may be generally applicable to various forms of hanging devices, a particularly useful form of the invention may be described as a preferred embodiment, namely, in the environment exemplified by the form of the invention illustrated in FIG. 1 wherein the hanger of the present invention is suspended from a wooden base provided by a rafter or joist identified as "W."

The hanger of the invention is identified generally at 10 and comprises a somewhat elongate article having a first claw or clamping arm formed as a U-shaped or C-shaped portion 11 and providing a pair of spaced apart extremities which could be called either spaced apart legs or spaced apart arms. In any event the two extremities form a first hook arm 12 and a second hook arm 13. The U or C-shaped clamping arm 11 has a bight portion 15 which is disposed opposite the mouth or throat of the C-shaped clamp provided between the hook arms 13 and 14.

A second suspension arm portion 14 is situated at the opposite end of the elongate article 10 and is provided with a curved or angulated projection 16 forming a force point 17 from which articles may be suspended and through which loading forces may be transmitted through the hanger 10 to the base W.

While the hanger 10 could be made of different types of material, including plastic of suitable strength, a particularly useful form of device can be provided by making the hanger 10 as a metal stamping, wherein the article in the shape of FIG. 1 is stamped from a flat sheet form member made of steel.

The hook arm 12 terminates in a free end having a reduced point 18, i.e., a sharp or tapering end, as of a dagger. In like manner, the hook arm 13 also terminates in a free end having a reduced point 19, i.e., a sharp or tapering end, as of a dagger. In longitudinal dimension, the hanger article 10 extends from the extremity formed by the point 19 to the bottom of the curved portion of the hook 16, i.e., roughly opposite the force point 17. It should be noted that the point 18 is spaced longitudinally as well as laterally relative to the point 19. Thus, the opening formed in the space between the points 18 and 19 will locate the two points 18 and 19 at two different levels relative to the wooden base W and on opposite sides of the base W.

The opening formed by the hook arms 12 and 13 can be analogized to a mouth, while the points 18 and 19 constitute the upper and lower lips of the mouth. The bight portion 15 prevents too deep an ingress of the base W into the mouth.

Assuming the vertical centerline axis of the base W to be disposed at the midpoint of the lateral spacing dimension between the points 18 and 19, the vertical center line axis intersecting the force point 17 is shifted perceptibly to the right, using the orientation of FIGS. 1 and 2, i.e., in the direction of the point 18 which is the closest in longitudinal spacing dimension.

Referring further specifically to FIG. 1, the relationship of the arm 13 to arm 12 allows an opening large enough to start the engagement of the hanger 10 with a wooden base member such as the rafter or joist depicted by the member W. After the hanger 10 is fully engaged with the base W, a downward and horizontal pulling action engages the points 18 and 19 with the surface of the wood base W.

Once the points 18 and 19 have begun to dig into the wood, the hanger 10 is ready to support a load. The heavier the downward pull caused by gravity acting on the object being hung or suspended from the hook 17 at the force point 17, the deeper the points 18 and 19 are urged into and below the surface of the wood.

Even without point penetration of the base W by one of either of the hooks 18 and 19 into the wood base W, the hanger 10 holds fast due to the clamping action of the reduced horizontal distance between the points 18 and 19 resulting from the geometry of the force pattern dictated by the design of the hanger 10.

More specifically, as explained above, the hanger 10 is constructed and arranged so that the axis of the arm 11 is different than the axis of the arm 14. Thus, when force is applied through the force point 17, the relationship of the main hanger portion to arms 13 and 14 is such that downward forces transmitted through the force point 17 continually vector through points 18 and 19 to clamp more tightly against the base W until a structural failure of the Base W occurs or until structural failure of the hanger 10 occurs.

In order to selectively remove the hanger 10 from the base W, the load on the hook 16 is simply released and the hanger elevated, thereby to relieve the clamping action on the points 18 and 19. Should it be desired to prevent accidental dislodgement of the hanger 10, it is contemplated by the present invention to provide an automatic locking means.

To that end, there is provided a small cam-like lever arm 20 comprising a metal stamping having a center body portion 21 from which extends in opposite directions a first leg 22 and a second leg 23. The center body portion 20 is apertured to permit attachment to the arm 13 by a rivet, or a pin, or some other suitable fastener 24 which will effect a pivotal or rotatable connection of the cam-like lever arm 20 to the arm 13.

As shown in the drawings, the lever arm 20 is disposed in a generally horizontal disposition so that the arm 22 extends laterally in one direction and the arm 23 extends to the opposite direction, while the pivot axis of the fastener 24 is disposed at the center. The lever arm 20 is proportioned and weighted so that when the rafter, or wood base W is disposed vertically and the hanger 10 is held vertically, as it would normally be when installed, the lever arm 20 settles in a plane or position similar to that shown in the drawings.

To facilitate that "automatic" positioning, it will be noted that the arm 22 has a projecting portion 26 forming a release lug which may be actuated upwardly, thereby to pivotally displace the lever arm 20 out of engagement with the base W. Further, the arm 23 has an irregular shape including a first wall 27 and a second wall 28 and a third wall 29, the three walls 27, 28 and 29 being arranged in successive adjacency outwardly of an inwardly spaced lightening aperture 30 formed in the arm 23. A corresponding lightening hole 31 is formed in the arm 22. The apertures 30 and 31 may be selectively sized to facilitate gravitational settling of the lever arm 20.

The design of the cam-like lever arm 20 allows the hanger 10 to be engaged with a rafter or joist such as the base W, but prevents the removal of the hanger 10, once an attempt has been made to secure the hanger 10 into a holding position. Accordingly, accidental dislodgement is prevented such as when a person accidentally bumps the hanger 10 while attempting to hang an object from the hook 16. The cam-like lever arm 20 works in such a way that it automatically compensates for the varying depths of point penetration by the points 18 and 19 into the rafter or joist of the wooden base W. However, when the hanger 10 is needed to be relocated or removed, the cam-like lever arm 20 is readily actuated simply by raising the release lug 26 whereupon the hanger 10 is unlocked by the upward motion of the arm 23 away from the adjoining surface of the base W.

In order to achieve the specific geometric relationship of the cam-like lever arm 20 to the other component elements of the hanger 10, it will be appreciated that the lever arm 20 must be pivotally mounted at a specific location point on the arm 13. That location is laterally opposite the point 18 in the approximate center of the arm 13. With respect to the optimal length, shape and center of gravity, the lever arm 20 should be of a length such that the wall 27 will lie in parallel abutment with the adjoining surface of a standard rafter or joist when the parts are installed as shown in FIG. 1.

If desired, the suspension portion 14 may be coated with a plastic material, for example, the end of the hanger 10 may be subjected to a PVC (polyvinylchloride) dip up to the reference line shown on FIG. 1, thereby providing a utilitarian coating 25 of desired thickness to enhance the operation of the hanger. Further, the coating may be colored in any desirable shade, should the user want to follow a selected decor at the area of utilization.

In operation, the utility hanger 10 is simply held in the hand without the necessity of using any supplemental tools or mounting accessories and the hanger is moved upwardly so that the edge of a rarer or joist W enters the mouth or throat of the C-shaped clamp, i.e., the opening defined between the points 18 and 19 of the hook arms 12 and 13. The bight portion 15 forms a convenient stop for engaging the bottom of the rarer or joist W, so it is virtually impossible to misalign or misposition the hanger on the joist or rafter.

By exerting even a small amount of force on the hook 16, the points 18 and 19 will begin to engage the side walls of the rarer or joist. Meanwhile, the automatic locking action of the lever arm 20 will already have been set in motion. As the hanger 10 is raised onto the base W, the rafter or joist will tend to engage one or the other of the walls 27, 28 and/or 29, thereby causing the cam-like lever arm 20 to pivot around the fastener axis 24 and to settle in place in engagement with the adjoining side wall of the base W.

If the user contemplates suspending a rod or a bar from the base W, for example, the tubular pipe P a plurality of hangers 10 may be fastened to the base W in spaced relation to one another and the rod or bar P may be placed in the hooks 16 for firm support thereby, as in FIG. 1. Should it be desired, openings 01 and 02 may be provided through which wire or other means of securement could be threaded for locking a bar or rod P in assembly with the hanger 10.

If a single hanger is to be used for suspending an object, the object may be connected to the hook 16. The greater weight placed on the hook, the greater the gripping or clamping force will be exerted against the base W.

The alternative embodiments illustrated in the other figures are each of a virtually identical structure and operation to that of the exemplary form of the invention described in connection with FIG. 1. Accordingly, like reference numerals have be employed to identify like parts and additional numbers have been used only to identify the parts that are different.

FIGS. 5, 6 and 7 show a hanger 10 made of lighter gauge sheet form stock wherein the article is stamped to include a stiffener flange 40 spaced inwardly of the edges of the hanger 10. In all other respects, the structure and function of the hanger 10 shown in FIGS. 5, 6 and 7 is similar to that of FIG. 1.

FIG. 2 shows a hanger 10 wherein the hook 16 of the FIG. 1 embodiment is somewhat modified to show an extended arm 160, thereby providing a support surface or edge suitable for carrying a two by four, or for some other similar special loading environment. An upwardly projecting tongue 162 for retaining purposes is formed at the free end of the arm 160. The preferred load center is depicted by a triangular symbol 163 and the critical angle range of 0 to 30 degrees is shown at 164, extending between the lines 166 and 167. In operation, the hanger of FIG. 2 enjoys the same characteristics as those of FIG. 1. The line 167 describes a vertical axis which intersects the point 18 and the suspension arm 14 on one side of the load center 163. The line 166 intersects the point 18 and the suspension arm 14 on the outwardly opposite side of the load center 163.

In FIGS. 9 and 10, the locking means takes the form of a threaded locking bolt 210, which is substituted for the locking means 21 of the FIG. 1 version. To accommodate the threaded locking bolt, an enlarged boss 240 is formed on the hook arm 13 which is apertured to receive the bolt 240. The bolt threads directly against the wood base W to secure the hanger in position without load. In all other respects the operation is the same.

In FIG. 8, the points 18 and 19 are shown in greater detail. As noted previously, the points are tapered or sharpened, but to prevent excessive penetration of the adjoining wood surfaces, a stop is provided as at 180 and 190, respectively.

In FIG. 4, a two element hanger forms the C-shaped clamping arm 11 as a stamping and the suspension hook 14 is formed as a wire form construction 140 which may be integrated with the clamping arm 11 in any acceptable manner, for example by welding at 141.

Although minor modifications might be suggested by those versed in the art, it should be understood that I wish to embody within the scope of the patent warranted hereon all such modifications as reasonably and properly come within the scope of my contribution to the art.

I claim as my invention:

1. A toolless utility hanger comprising a sheet form relatively flat article of somewhat overall elongate configuration and more particularly comprising a first generally c-shaped clamping portion at one end having first and second legs spaced laterally relative to a bight portion and on opposite sides of a vertical center line axis, each of said first and second legs terminating in a hook tapered to form a point, said first and second legs forming a mouth large enough to freely receive wooden base members of a selected variable width in said mouth, said points forming the upper and lower lips of said mouth and said bight portion forming a stop to prevent too deep an ingress of the wooden base members into said mouth, whereby a wood base member such as a rafter or a joist may be disposed between said first and second legs with opposite sides thereof engageable with said points, the point on one of said legs being relatively spaced longitudinally from the point on the other of said legs, and a suspension load receiving portion having a force point disposed in laterally offset relation to the said points on said first and second legs, when the hanger is installed to hang vertically from said wooden base member, said points simultaneously engaging the adjoining surfaces of the wooden base member after the wooden base member is fully received within the hanger and when downward and horizontal pulling action is initially applied to said force point, whereby vertically downwardly loading forces transmitted through said force point will vector laterally to clamp said points firmly against the adjoining walls of said wooden base member.

2. A toolless hanger as defined in claim 1 and further characterized by locking means carried on one of said legs and adapted to engage the corresponding adjoining wall of said wooden base, thereby to prevent accidental dislodgement of the hanger, but allowing selective removal upon disabling the locking means.

3. A toolless hanger as defined in claim 2 wherein said locking means comprises, a cam-like lever bar pivotally connected to said one leg and adapted to pivot freely on its pivot axis, said lever bar having a first leg extending away from the pivot axis to engage the adjoining wall of the base and having a second leg extending into an accessible location to form a release lug for selectively pivotally displacing said lever bar to an unlocked position, thereby to facilitate removal of the hanger from the base.

4. A toolless hanger as defined in claim 2 and further characterized by said locking means comprising an apertured lug means on said one of said legs and a screw threaded member received in said lug means for screw threaded advancement against the adjoining surface of the wooden base, thereby to lock the hanger on the base.

5. A toolless hanger as defined in claim 1 wherein said suspension portion comprises, a second flat curved hook portion constructed and arranged to be integral with said clamping portion and disposed in a relatively horizontal position relative to said vertical center line axis of the suspended hanger and having said force point disposed generally at the midpoint of the curve of the hook.

6. A toolless hanger as defined in claim 1 and wherein said suspension portion more particularly comprises, a second flat portion integral with said clamping portion and forming an extended arm having a straight portion transverse to said center line axis and an end portion forming a retainer projecting in an upward direction, thereby to carry wide flat loading pieces such as a two by four, said extended arm having a load carrying force point disposed at a median portion of said straight portion and having said load carrying portion disposed within the limits of a critical angle range of from about 0 to 30 degrees measured from a vertical axis extending through the lower most of said points.

7. A toolless hanger as defined in claim 5 or 6 wherein said hanger comprises a metal stamping formed of flat plate stock.

8. A toolless hanger as defined in claim 1 wherein said hanger comprises a metal stamping formed of flat plate material and wherein said hanger is characterized by an offset flange spaced inwardly of its outer periphery, thereby to form a strengthening rib for the hanger.

9. A toolless hanger as defined in claim 1 wherein said hanger comprises a two piece combination of:

(1) a flat metal stamping forming the C-shaped clamping portion and, (2) a wire form construction forming a suspension hook, said part (1) and part (2) being fastened together in firm assembly with one another by a weldment forming a permanent connection therebetween.

10. A toolless hanger as defined in claim 1 and further characterized by said suspension portion being coated with a layer of plastic material.

11. A single entity hanger adapted to be used with a wooden base such as a rafter or a joist, comprising:

a flat metal body having two separate but integrated portions forming a first claw portion at one end and a second hook portion on the other end, said claw portion more particularly comprising a U-shaped portion having two spaced apart arms forming a mouth sized to freely receive the end of a conventionally shaped rafter or joist a selected variable thickness, said claw having a bight portion on a vertical center line axis of said hanger and disposed at the inner most ends of the arms to form a stop engageable with the end of the rafter or joist inserted into the mouth, to prevent too deep egress into said mouth, the free ends of said arms terminating at different levels relative to the bight portion on opposite lateral sides of the center line axis and each being formed with a point for concurrently promoting a penetrating function with the adjoining surface of the rafter or joist, when an initial downward and horizontal pulling action is applied to the hanger, said hook portion more particularly comprising a portion extending longitudinally away from said claw portion and terminating in a laterally projecting load beating portion forming a force point which is on an axis laterally offset from the vertical center line axis of the hanger when assembled with the rafter or joist, whereby loading forces applied downwardly at said force point will vector so that the vector forces will develop a moment arm which promotes gripping of the rafter or joist by the claw portion while carrying loads suspended from the hook.

* * * * *